US011927674B2

(12) United States Patent
Febbo et al.

(10) Patent No.: US 11,927,674 B2
(45) Date of Patent: Mar. 12, 2024

(54) SYSTEM AND METHOD FOR PROVIDING A COMPREHENSIVE TRAJECTORY PLANNER FOR A PERSON-FOLLOWING VEHICLE

(71) Applicant: Honda Motor Co., Ltd., Tokyo (JP)

(72) Inventors: Huckleberry Febbo, Los Gatos, CA (US); Jiawei Huang, San Jose, CA (US); David Francis Isele, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 16/743,488

(22) Filed: Jan. 15, 2020

(65) Prior Publication Data

US 2021/0080589 A1    Mar. 18, 2021

Related U.S. Application Data

(60) Provisional application No. 62/901,020, filed on Sep. 16, 2019.

(51) Int. Cl.
*G01S 17/931* (2020.01)
*B60R 11/04* (2006.01)
(Continued)

(52) U.S. Cl.
CPC ............ *G01S 17/931* (2020.01); *B60R 11/04* (2013.01); *G01S 17/86* (2020.01); *G05D 1/0246* (2013.01); *B60R 2300/301* (2013.01)

(58) Field of Classification Search
CPC ..... G01S 17/931; G01S 17/86; G05D 1/0246; G05D 1/0094; G05D 1/0248;
(Continued)

(56) References Cited

U.S. PATENT DOCUMENTS

2003/0058111 A1* 3/2003 Lee ................. G08B 13/19641
2006/0064203 A1* 3/2006 Goto .................... G05D 1/0246
(Continued)

FOREIGN PATENT DOCUMENTS

EP    2476035 A1 *    7/2012    ........... G01S 5/0072

OTHER PUBLICATIONS

Bohlmann, Karsten, et al. "Autonomous person following with 3D LIDAR in outdoor environment." Journal of Automation Mobile Robotics and Intelligent Systems 7.2 (2013): 24-29. (Year: 2013).*
(Continued)

*Primary Examiner* — Elaine Gort
*Assistant Examiner* — Ellis B. Ramirez
(74) *Attorney, Agent, or Firm* — RANKIN, HILL & CLARK LLP

(57) ABSTRACT

A system and method for providing a comprehensive trajectory planner for a person-following vehicle that includes receiving image data and LiDAR data associated with a surrounding environment of a vehicle. The system and method also include analyzing the image data and detecting the person to be followed that is within an image and analyzing the LiDAR data and detecting an obstacle that is located within a predetermined distance from the vehicle. The system and method further include executing a trajectory planning algorithm based on fused data associated with the detected person and the detected obstacle.

18 Claims, 5 Drawing Sheets

(51) Int. Cl.
   *G01S 17/86* (2020.01)
   *G05D 1/00* (2006.01)
   *G05D 1/02* (2020.01)

(58) Field of Classification Search
   CPC ........ B60R 2300/307; B60R 2300/301; B60R
                                       1/00; B60R 11/04
   USPC ..................... 701/28, 25, 26, 410, 411, 416;
                                       340/539.2; 348/113
   See application file for complete search history.

(56) References Cited

U.S. PATENT DOCUMENTS

| | | | |
|---|---|---|---|
| 2007/0193798 A1* | 8/2007 | Allard ................. | G05B 19/414 180/169 |
| 2010/0228419 A1* | 9/2010 | Lee .................... | B62D 15/0255 701/25 |
| 2011/0001813 A1* | 1/2011 | Kim ........................ | G06V 40/28 |
| 2011/0026770 A1* | 2/2011 | Brookshire .......... | G05D 1/0251 382/103 |
| 2011/0085702 A1 | 4/2011 | Nevatia et al. | |
| 2012/0316680 A1* | 12/2012 | Olivier, III .......... | G05D 1/0246 |
| 2013/0096698 A1 | 4/2013 | Ulyanov | |
| 2013/0342652 A1* | 12/2013 | Kikkeri .................... | B25J 9/104 348/46 |
| 2014/0032012 A1 | 1/2014 | Joshi et al. | |
| 2014/0324339 A1 | 10/2014 | Adam et al. | |
| 2018/0129217 A1* | 5/2018 | Asada ................. | G05D 1/0246 |
| 2018/0181137 A1* | 6/2018 | Choi .................... | G06F 18/2411 |
| 2018/0203124 A1* | 7/2018 | Izzat ..................... | G01S 13/865 |
| 2018/0213994 A1* | 8/2018 | Lee ......................... | G06T 7/194 |
| 2018/0300556 A1* | 10/2018 | Varerkar ............... | G06V 20/40 |
| 2019/0310650 A1* | 10/2019 | Halder ................. | G05D 1/0088 |
| 2019/0367022 A1* | 12/2019 | Zhao ............... | B60W 30/18154 |
| 2019/0377345 A1* | 12/2019 | Bachrach ............... | G06V 20/17 |
| 2020/0064827 A1* | 2/2020 | Miller .................... | G06V 40/28 |
| 2020/0401148 A1* | 12/2020 | Hong ................... | G05D 1/0088 |
| 2022/0024486 A1* | 1/2022 | Scott .................... | G05D 1/0251 |
| 2023/0252280 A1 | 8/2023 | Donderici | |
| 2023/0252728 A1 | 8/2023 | Marotta et al. | |
| 2023/0252796 A1 | 8/2023 | Bao et al. | |

OTHER PUBLICATIONS

A. H. Adiwahono et al., "Human tracking and following in dynamic environment for service robots," TENCON 2017—2017 IEEE Region 10 Conference, 2017, pp. 3068-3073, doi: 10.1109/TENCON.2017.8228388. (Year: 2017).*

John T Betts. Practical methods for optimal control and estimation using nonlinear programming, vol. 19. Siam, 2010.

Borna Ghannadi, Naser Mehrabi, Reza Sharif Razavian, and John McPhee. "Nonlinear model predictive control of an upper extremity rehabilitation robot using a two-dimensional human-robot interaction model." In International Conference on Intelligent Robots and Systems, pp. 502-507. IEEE, 2017.

J. Huang, M. Demir, T. Lian, and K. Fujimura. "An online multi-lidar dynamic occupancy mapping method." In 2019 IEEE Intelligent Vehicles Symposium (IV), pp. 517-522, Jun. 2019.

Jiechao Liu, Paramsothy Jayakumar, Jeffrey L Stein, and Tulga Ersal. "A study on model fidelity for model predictive control-based obstacle avoidance in high-speed autonomous ground vehicles." Vehicle System Dynamics, 54 (11):1629-1650, 2016.

Jiechao Liu, Paramsothy Jayakumar, Jeffrey L Stein, and Tulga Ersal. "Combined speed and steering control in high-speed autonomous ground vehicles for obstacle avoidance using model predictive control." IEEE Transactions on Vehicular Technology, 66(10):8746-8763, 2017.

Payam Nikdel, Rakesh Shrestha, and Richard Vaughan. "The hands-free push-cart: Autonomous following in front by predicting user trajectory around obstacles." In 2018 IEEE International Conference on Robotics and Automation (ICRA), pp. 1-7. IEEE, 2018.

Rajesh Rajamani. "Vehicle dynamics and control." Springer Science and Business Media, 2011.

Aine Ilina Tarmizi, Ahmad Zaki Shukor, Nur Maisarah Mohd Sobran, and Muhammad Herman Jamaluddin. "Latest trend in person following robot control algorithm: A review." Journal of Telecommunication, Electronic and Computer Engineering (JTEC), 9(3):169-174, 2017.

Huckleberry Febbo. "NLOptControl." https://github.com/JuliaMPC/NLOptControl.jl, 2017.

Jarrett Revels. Reversediff. https://github.com/JuliaDiff/ReverseDiff.jl, 2017.

G Basset, Yunjun Xu, and OA Yakimenko. "Computing short-time aircraft maneuvers using direct methods." Journal of Computer and Systems Sciences International, 49(3):481-513, 2010.

Jeff Bezanson, Stefan Karpinski, Viral B Shah, and Alan Edelman. "Julia: A fast dynamic language for technical computing." arXiv preprint arXiv:1209.5145, 2012.

Bao Xin Chen, Raghavender Sahdev, and John K Tsotsos. "Integrating stereo vision with a cnn tracker for a person-following robot." In International Conference on Computer Vision Systems, pp. 300-313. Springer, 2017.

Akansel Cosgun, Dinei A Florencio, and Henrik I Christensen. "Autonomous person following for telepresence robots." In 2013 IEEE International Conference on Robotics and Automation, pp. 4335-4342. IEEE, 2013.

Iain Dunning, Joey Huchette, and Miles Lubin. "Jump: A modeling language for mathematical optimization." SIAM Review, 59(2):295-320, 2017.

Huckleberry Febbo. Real-time Trajectory Planning to Enable Safe and Performant Automated Vehicles Operating in Unknown Dynamic Environments. PHD thesis, 2019.

Huckleberry Febbo, Jiechao Liu, Paramsothy Jayakumar, Jeffrey L Stein, and Tulga Ersal. "Moving obstacle avoidance for large, high-speed autonomous ground vehicles." In American Control Conference, pp. 5568-5573, 2017.

Andreas Griewank, David Juedes, and Jean Utke. Algorithm 755: "Adol-c: a package for the automatic differentiation of algorithms written in c/c++." ACM Transactions on Mathematical Software (TOMS), 22(2):131-167, 1996.

Christopher Jewison, R Scott Erwin, and Alvar Saenz-Otero. "Model predictive control with ellipsoid obstacle constraints for spacecraft rendezvous." IFAC-PapersOnLine, 48(9):257-262, 2015.

Matthew Kelly. "An introduction to trajectory optimization: How to do your own direct collocation." SIAM Review, 59 (4):849-904, 2017.

Sikang Liu, Nikolay Atanasov, Kartik Mohta, and Vijay Kumar. "Search-based motion planning for quadrotors using linear quadratic minimum time control." In International Conference on Intelligent Robots and Systems, pp. 2872-2879. IEEE, 2017.

Sikang Liu, Kartik Mohta, Nikolay Atanasov, and Vijay Kumar. "Search-based motion planning for aggressive flight in se (3)." IEEE Robotics and Automation Letters, 3(3):2439-2446, 2018.

Kartik Mohta, Ke Sun, Sikang Liu, Michael Watterson, Bernd Pfrommer, James Svacha, Yash Mulgaonkar, Camillo Jose Taylor, and Vijay Kumar. "Experiments in fast, autonomous, gps-denied quadrotor flight." arXiv preprint arXiv:1806.07053, 2018.

Jong Jin Park and Benjamin Kuipers. "Autonomous person pacing and following with model predictive equilibrium point control." In 2013 IEEE International Conference on Robotics and Automation, pp. 1060-1067. IEEE, 2013.

Shaoqing Ren, Kaiming He, Ross B. Girshick, and Jian Sun. "Faster R-CNN: towards real-time object detection with region proposal networks." CoRR, abs/1506.01497, 2015.

Francisca Vasconcelos and Nuno Vasconcelos. "Person-following uavs." In 2016 IEEE Winter Conference on Applications of Computer Vision (WACV), pp. 1-9. IEEE, 2016.

E Velenis, P Tsiotras, and J Lu. "Aggressive maneuvers on loose sur-faces: Data analysis and input parametrization." In 2007 Mediterranean Conference on Control & Automation, pp. 1-6. IEEE, 2007.

David Wooden, Matthew Malchano, Kevin Blankespoor, Andrew Howardy, Alfred A Rizzi, and Marc Raibert. "Autonomous naviga-

(56) References Cited

OTHER PUBLICATIONS tion for bigdog." In 2010 IEEE International Conference on Robotics and Automation, pp. 4736-4741. IEEE, 2010.

Xiaojing Zhang, Alexander Liniger, and Francesco Borrelli. "Optimization-based collision avoidance." arXiv preprint arXiv:1711.03449, 2017.

J Gonzales, F Zhang, K Li, and F Borrelli. "Autonomous drifting with onboard sensors." In Advanced Vehicle Control, p. 133. CRC Press, 2016.

Goran Huskić, Sebastian Buck, Luis Azareel Ibargüen González, and Andreas Zell. "Outdoor person following at higher speeds using a skid-steered mobile robot." In 2017 IEEE/RSJ International Conference on Intelligent Robots and Systems (IROS), pp. 3433-3438. IEEE, 2017.

Jason Kong, Mark Pfeiffer, Georg Schildbach, and Francesco Borrelli. "Kinematic and dynamic vehicle models for autonomous driving control design." IEEE Intelligent Vehicles Symposium, Proceedings, Aug. 2015: 1094-1099, 2015.

Krisada Kritayakirana and J Christian Gerdes. "Using the centre of percussion to design a steering controller for an autonomous race car." Vehicle System Dynamics, 50(sup1):33-51, 2012.

Angus Leigh, Joelle Pineau, Nicolas Olmedo, and Hong Zhang. "Person tracking and following with 2d laser scanners." In 2015 IEEE International Conference on Robotics and Automation (ICRA), pp. 726-733. IEEE, 2015.

International Search Report and Written Opinion of PCT/US2020/049666 dated Dec. 17, 2020, 9 pages.

Office Action of U.S. Appl. No. 16/903,976 dated Aug. 17, 2023, 42 pages.

Notice of Allowance of U.S. Appl. No. 16/903,976 dated Nov. 7, 2023, 7 pages.

* cited by examiner

SYSTEM AND METHOD FOR PROVIDING A COMPREHENSIVE TRAJECTORY PLANNER FOR A PERSON-FOLLOWING VEHICLE

CROSS-REFERENCE TO RELATED APPLICATION

This application claims priority to U.S. Provisional Application Ser. No. 62/901,020 filed on Sep. 16, 2019, which is expressly incorporated herein by reference.

BACKGROUND

Person following has been researched on a wide variety of robotic platforms, including wheel chairs, legged robots, and skid-steer platforms. In many cases, person following has been researched assuming a static environment and/or unobstructed pathway environments (e.g., that include unobstructed sidewalks, hallways, gridded paths, etc.) to allow robotic platforms to uncritically follow a person. Techniques that have been developed based on such research with respect to person following in such static and/or unobstructed pathway environments have been found not to be practical in real-world applications that may require a determination of open spaces that may be navigated to avoid any overlap with potential obstacles. For example, in some cases, a person may fit through a tight gap between two obstacles which may not be easily navigated by a robotic platform. Accordingly, such techniques may result in a miscalculation of available open space based on the following of a person which may inhibit the unobstructed movement of the robotic platform.

BRIEF DESCRIPTION

According to one aspect, a computer-implemented method for providing a comprehensive trajectory planner for a person-following vehicle that includes receiving image data and LiDAR data associated with a surrounding environment of a vehicle. The computer-implemented method also includes analyzing the image data and detecting the person to be followed that is within an image and analyzing the LiDAR data and detecting an obstacle that is located within a predetermined distance from the vehicle. The computer-implemented method further includes executing a trajectory planning algorithm based on fused data associated with the detected person and the detected obstacle. The trajectory planning algorithm utilizes nonlinear model predictive control to enable the vehicle to follow the person within the surrounding environment of the vehicle.

According to another aspect, a system for providing a comprehensive trajectory planner for a person-following vehicle that includes a memory storing instructions when executed by a processor cause the processor to receive image data and LiDAR data associated with a surrounding environment of a vehicle. The instructions also cause the processor to analyze the image data and detecting the person to be followed that is within an image and analyze the LiDAR data and detecting an obstacle that is located within a predetermined distance from the vehicle. The instructions further cause the processor to execute a trajectory planning algorithm based on fused data associated with the detected person and the detected obstacle. The trajectory planning algorithm utilizes nonlinear model predictive control to enable the vehicle to follow the person within the surrounding environment of the vehicle.

According to yet another aspect, a non-transitory computer readable storage medium storing instructions that when executed by a computer, which includes a processor perform a method that includes receiving image data and LiDAR data associated with a surrounding environment of a vehicle. The computer-implemented method also includes analyzing the image data and detecting a person to be followed that is within an image and analyzing the LiDAR data and detecting an obstacle that is located within a predetermined distance from the vehicle. The computer-implemented method further includes executing a trajectory planning algorithm based on fused data associated with the detected person and the detected obstacle. The trajectory planning algorithm utilizes nonlinear model predictive control to enable the vehicle to follow the person within the surrounding environment of the vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
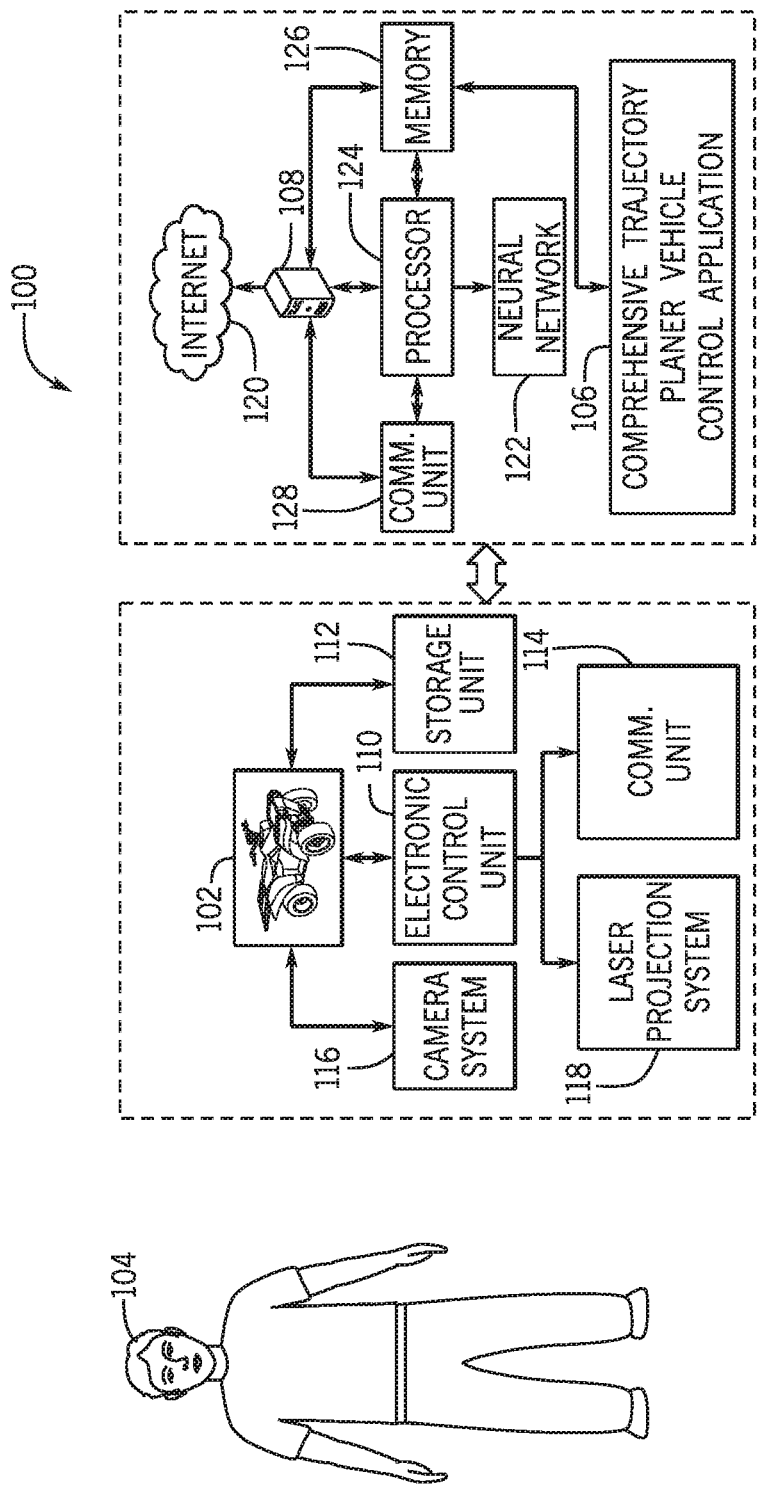
FIG. 1 is a high-level schematic view of an illustrative system for providing a comprehensive trajectory planner for a person-following vehicle according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview:

Referring now to the drawings, wherein the showings are for purposes of illustrating one or more exemplary embodiments and not for purposes of limiting same, FIG. 1 is a high-level schematic view of an illustrative system 100 for providing a comprehensive trajectory planner for a person-following vehicle 102 according to an exemplary embodiment of the present disclosure. The components of the system 100, as well as the components of other systems and architectures discussed herein, may be combined, omitted or organized into different architectures for various embodiments.

In an exemplary embodiment of FIG. 1, the vehicle 102 may be configured to follow (e.g., within a predetermined distance) a particular individual as a goal 104 (person) that is traveling (e.g., walking, running, etc.) within a surrounding environment of the vehicle 102. In an exemplary embodiment, the vehicle 102 may be configured as an all-terrain vehicle (ATV) as shown in FIG. 1 that may be configured to travel in paved and unpaved (e.g., off-road) environments and may be configured to carry heavy payloads (e.g., objects, persons). However, it is appreciated that the vehicle 102 may be configured in variety of various formats that may include, but may not be limited to, a legged robot, a wheeled robot, a skid-steer platform, a fork lift, a wagon, a shopping cart, a suit case, a personal transportation vehicle, a stroller, a baby/child carrier, a scooter, and/or additional types of occupant/object transportation devices.

In some embodiments, the vehicle 102 may be configured to operate in a manual mode by the person 104, such that the person 104 may move the vehicle 102 manually (e.g., by pushing, pulling, and/or manually driving the vehicle 102). The vehicle 102 may additionally be configured to be operated in a semi-automatic mode by the person 104, such that a motor/engine (not shown) of the vehicle 102 may provide a certain amount of motive power to assist in moving the vehicle 102. The vehicle 102 may additionally be operated within an autonomous mode. Within the autonomous mode, the vehicle 102 may operably be controlled to follow the person 104 that is located within a predetermined distance of the vehicle 102 in a fully autonomous or semi-autonomous manner within the surrounding environment of the vehicle 102 based on execution of a comprehensive trajectory planner vehicle control application 106 (vehicle control application). In one or more embodiments, the vehicle 102 may be configured as a front-wheel steered vehicle. In additional embodiments, the vehicle 102 may be configured as an all-wheel steered vehicle and/or a rear wheel steered vehicle.

In an exemplary embodiment, an externally hosted server infrastructure (external server) 108 and/or an electronic control unit (ECU) 110 of the vehicle 102 may be configured to execute the vehicle control application 106. As discussed in more detail below, the vehicle control application 106 may be configured to execute a trajectory planning algorithm to enable the vehicle 102 to follow the person 104. The trajectory planning algorithm may be configured to enable the vehicle 102 to maneuver in various manners. In one configuration, the trajectory planning algorithm executed by the vehicle control application 106 may be configured for the front-wheel steered vehicle 102 to allow the vehicle 102 to follow the person 104. In alternate configurations, the trajectory planning algorithm may alternatively be configured for all-wheel steered vehicles or rear wheel steered vehicles.

In one embodiment, the trajectory planning algorithm executed by the vehicle control application 106 may be configured to enable the vehicle 102 to follow the person 104 while avoiding any overlap with both static (non-moving) and/or dynamic (moving) obstacles that the vehicle 102 may come across. The trajectory planning algorithm may simultaneously optimize a speed of the vehicle 102 and steering of the vehicle 102 to minimize control effort required to follow the person 104 within the surrounding environment of the vehicle 102 The vehicle control application 106 may thereby utilize outputs of the trajectory planning algorithm to provide nonlinear productive control of the vehicle 102 to follow the person 104 in different types of environments, including roadway environments, pathway environments, off-road environments, uneven ground environments, interior environments, and the like. For example, the vehicle control application 106 may utilize outputs of the trajectory planning algorithm to safely follow the person 104 on uneven grass, near obstacles, over ditches and curbs, on asphalt over train-tracks, and/or near buildings and automobiles.

With continued reference to FIG. 1, in addition to the ECU 110, the vehicle 102 may include a storage unit 112, a communication unit 114, a camera system 116, and a laser projection system 118. In an exemplary embodiment, the ECU 110 may execute one or more applications, operating systems, vehicle system and subsystem executable instructions, among others. In one or more embodiments, the ECU 110 may include a microprocessor, one or more application-specific integrated circuit(s) (ASIC), or other similar devices. The ECU 110 may also include an internal processing memory, an interface circuit, and bus lines for transferring data, sending commands, and communicating with the plurality of components of the vehicle 102.

The ECU 110 may include a respective communication device (not shown) for sending data internally to components of the vehicle 102 and communicating with externally hosted computing systems (e.g., external to the vehicle 102). Generally the ECU 110 may be operably connected to the storage unit 112 and may communicate with the storage unit 112 to execute one or more applications, operating systems, vehicle systems and subsystem user interfaces, and the like that are stored on the storage unit 112. The storage unit 112 may be configured to store data associated with computer-implemented instructions associated with comprehensive trajectory planning for the vehicle 102.

In one or more embodiments, the ECU 110 may be configured to operably control the plurality of components of the vehicle 102. The ECU 110 may also provide one or more commands to one or more control units (not shown) of the vehicle 102 including, but not limited to, a motor/engine control unit, a braking control unit, a turning control unit, a transmission control unit, and the like to control the vehicle 102 to be autonomously operated. As discussed below, the ECU 110 may autonomously control the vehicle 102 based on one or more commands that are provided by the vehicle control application 106 upon the execution of the trajectory planning algorithm.

In one or more embodiments, the storage unit 112 may configured to store data, for example, one or more images, videos, one or more sets of image coordinates that may be provided by the camera system 116 and/or one or more sets of LiDAR coordinates associated with one or more persons (e.g., including the person 104), static objects (e.g., including one or more static obstacles), and/or dynamic objects (e.g., including one or more dynamic obstacles) located within the surrounding environment of the vehicle 102.

In an exemplary embodiment, the camera system 116 of the vehicle 102 may include one or more cameras that are positioned at one or more exterior portions of the vehicle 102 to capture the surrounding environment of the vehicle 102 (e.g., a vicinity of the vehicle 102). The camera(s) of the camera system 116 may be positioned in a direction to capture the surrounding environment of the vehicle 102 that includes areas located around (front/sides/behind) the vehicle 102. In one or more configurations, the one or more cameras of the camera system 116 may be disposed at external front, rear, and/or side portions of the including, but not limited to different portions of the bumpers, lighting units, body panels, and the like. The one or more cameras may be positioned on a respective planar sweep pedestal (not shown) that allows the one or more cameras to be oscillated to capture images of the surrounding environments of vehicle 102.

In one embodiment, the camera system 116 may output image data that may be associated with untrimmed images/video of the surrounding environment of the vehicle 102. In some embodiments, the vehicle control application 106 may be configured to execute image logic (e.g., pre-trained computer logic) to analyze the image data and determine vehicle based observations associated with the surrounding environment of the vehicle 102. In some configurations, the vehicle control application 106 may be configured to analyze the image data using the image logic to classify and determine the position of one or more people, static objects, and/or dynamic objects that may be located within the surrounding environment of the vehicle 102.

In an exemplary embodiment, the ECU 110 may also be operably connected to the laser projection system 118 of the vehicle 102. The laser projection system 118 may include one or more respective LiDAR transceivers (not shown). The one or more respective LiDAR transceivers of the respective laser projection system 118 may be disposed at external front, rear, and/or side portions of bumpers, body panels, lighting units, and the like of the vehicle 102.

The one or more respective LiDAR transceivers may include one or more planar sweep lasers that include may be configured to oscillate and emit one or more laser beams of ultraviolet, visible, or near infrared light toward the surrounding environment of the vehicle 102. The laser projection system 118 may be configured to receive one or more reflected laser waves based on the one or more laser beams emitted by the LiDAR transceivers. For example, one or more reflected laser waves may be reflected off of the person 104, one or more dynamic objects, one or more static objects, one or more boundaries (e.g., guardrails, walls) that may be located within the surrounding environment of the vehicle 102.

In an exemplary embodiment, the laser projection system 118 may be configured to output LiDAR data that may be associated with the one or more reflected laser waves. In some embodiments, the vehicle control application 106 may receive the LiDAR data communicated by the laser projection system 118 and may execute LiDAR logic (e.g., pre-trained computer logic) to analyze the LiDAR data and determine LiDAR based observations associated with the surrounding environment of the vehicle 102. In some configurations, the vehicle control application 106 may be configured to analyze the LiDAR data using the LiDAR logic to classify and determine the position of people, static objects, and/or dynamic objects that may be located within the surrounding environment of the vehicle 102.

As discussed in more detail below, in one embodiment, the vehicle control application 106 may be configured to analyze the image data and/or the LiDAR data through execution of a perception algorithm. The perception algorithm may be configured to detect static and/or dynamic objects of interest such as the person 104 to be followed by the vehicle 102 and/or one or more obstacles that may be located within the surrounding environment of the vehicle 102. The application 106 may be configured to input such detections and associated data to be utilized during execution of the trajectory planning algorithm.

With continued reference to FIG. 1, in one embodiment, the communication unit 114 of the vehicle 102 may be operably controlled by the ECU 110 of the vehicle 102. The communication unit 114 may be operably connected to one or more transceivers (not shown) of the vehicle 102. The communication unit 114 may be configured to communicate through an internet cloud 120 through one or more wireless communication signals that may include, but may not be limited to Bluetooth® signals, Wi-Fi signals, ZigBee signals, Wi-Max signals, and the like.

In one embodiment, the communication unit 114 may be configured to connect to the internet cloud 120 to send and receive communication signals to and from the external server 108. The external server 108 may host a neural network 122 that may be pre-trained with one or more datasets to detect the person 104, additional persons (e.g., pedestrians), and/or obstacles that are located within the surrounding environment of the vehicle 102. In one or more embodiments, the vehicle control application 106 may access the neural network 122 to process a programming model which enables computer/machine based/deep learning that may be centered on one or more forms of data that are inputted to the neural network 122 to provide inputs to execute the trajectory planning algorithm.

With continued reference to the external server 108, the processor 124 may be operably connected to a memory 126. The memory 126 may store one or more operating systems, applications, associated operating system data, application data, executable data, and the like. In one embodiment, the processor 124 of the external server 108 may additionally be configured to communicate with a communication unit 128. The communication unit 128 may be configured to communicate through the internet cloud 120 through one or more wireless communication signals that may include, but may not be limited to Bluetooth® signals, Wi-Fi signals, ZigBee signals, Wi-Max signals, and the like.

In one embodiment, the communication unit 128 may be configured to connect to the internet cloud 120 to send and receive communication signals to and from the vehicle 102. In particular, the external server 108 may receive image data and LiDAR data that may be communicated by the vehicle 102 based on the utilization of the camera system 116 and the laser projection system 118. As discussed, such data may be inputted for perception to determine a goal of the vehicle 102 as the person 104 to be followed and one or more obstacles that may detected and inputted to the trajectory planner algorithm.

II. The Vehicle Control Application and Related Methods

The general functionality of the vehicle control application 106 will now be discussed in more detail with respect to exemplary methods that may be executed by the application 106. In an exemplary embodiment, the vehicle control application 106 may be fully or partially executed by the ECU 110 of the vehicle 102. Additionally or alternatively, the vehicle control application 106 may be fully or partially executed by the processor 124 of the external server 108. The vehicle control application 106 may utilize the communication unit 114 of the vehicle 102 and the communication unit 128 of the external server 108 to communicate application related data between the vehicle 102 and the external server 108.

Figure 2:
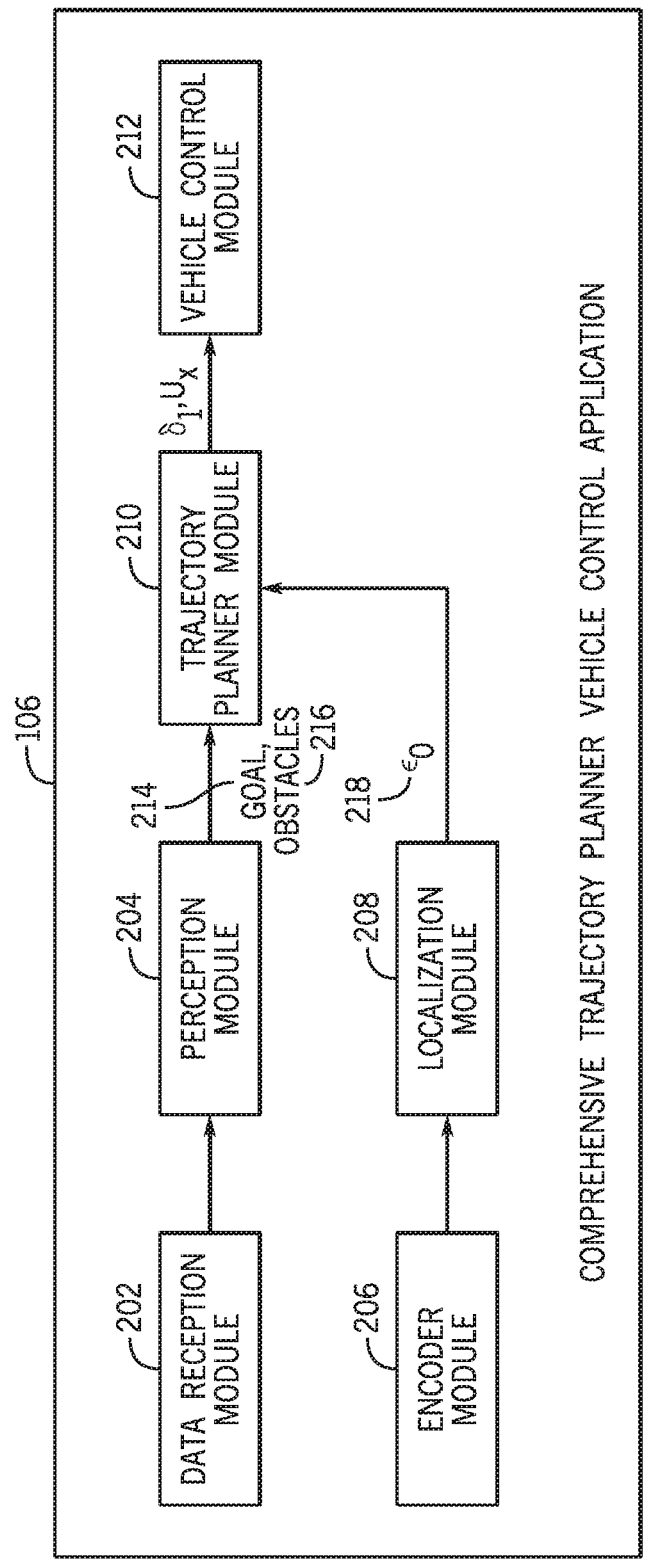
FIG. 2 is a schematic view of the modules of the vehicle control application that may execute computer-implemented instructions for providing a comprehensive trajectory planner for a person-following vehicle according to an exemplary embodiment of the present disclosure.

FIG. 2 is a schematic view of the modules 202-212 of the vehicle control application 106 that may execute computer-implemented instructions for providing a comprehensive trajectory planner for a person-following vehicle according to an exemplary embodiment of the present disclosure. In an exemplary embodiment, the plurality of modules 202-212 may include a data reception module 202, a perception module 204, an encoder module 206, a localization module 208, a trajectory planning module 210, and a vehicle control module 212. However, it is appreciated that the vehicle control application 106 may include one or more additional modules and/or sub-modules that are included in addition to or in lieu of the modules 202-212. The functionality of the plurality of modules 202-212 of the vehicle control application 106 will now be described in detail with reference to computer-executed methods that are executed by the vehicle control application 106.

Figure 3:
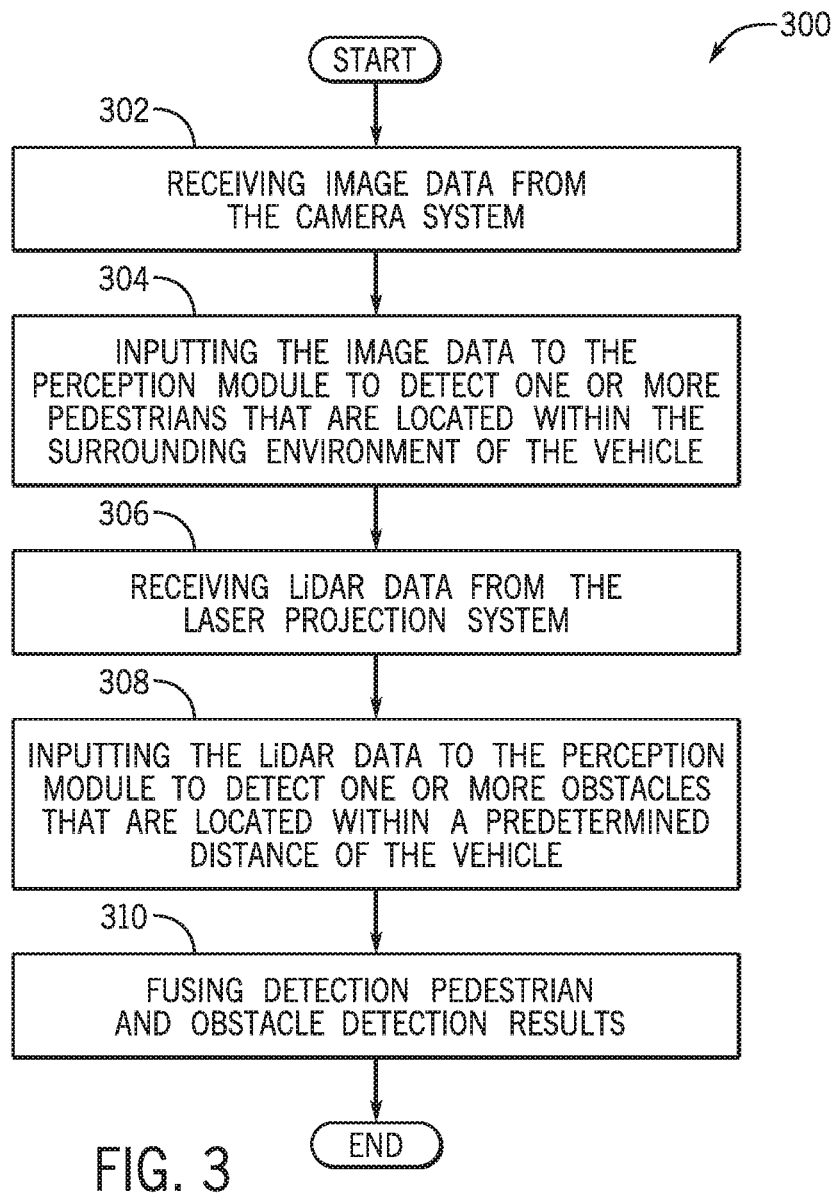
FIG. 3 is a process flow diagram of a method for detecting persons, objects, and obstacles within the surrounding environment of the vehicle based on image data and LiDAR data according to an exemplary embodiment of the present disclosure.

FIG. 3 is a process flow diagram of a method 300 for detecting persons, objects, and obstacles within the surrounding environment of the vehicle 102 based on image data and LiDAR data according to an exemplary embodiment of the present disclosure. FIG. 3 will be described with reference to the components of FIG. 1 and FIG. 2, through it is to be appreciated that the method 300 of FIG. 3 may be used with additional and/or alternative system components.

The method 300 may begin at block 302, wherein the method 300 may include receiving image data from the camera system 116. In an exemplary embodiment, the data reception module 202 of the vehicle control application 106 may be configured to communicate with the camera system 116 to receive image data associated with one or more images of the surrounding environment of the vehicle 102. As discussed above, the camera system 116 may output image data that may be associated with untrimmed images/video of the surrounding environment of the vehicle 102.

The method 300 may proceed to block 304, wherein the method 300 may include inputting the image data to the perception module 204 to detect the one or more pedestrians that are located within the surrounding environment of the vehicle 102. In an exemplary embodiment, upon receiving the image data, the data reception module 202 may be configured to input the image data associated with the images of the surrounding environment of the vehicle 102 to the perception module 204 of the vehicle control application 106. The perception module 204 may be configured to execute a perception algorithm that may be configured to analyze the image data input to determine persons and objects including the person 104 that is to be followed by the vehicle 102 as a goal.

Figure 4:
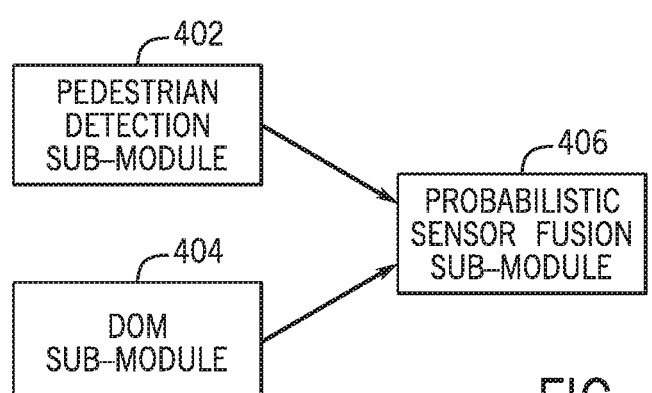
FIG. 4 is a schematic overview of an architecture of the sub-modules of a perception module of the vehicle control application according to an exemplary embodiment of the present disclosure.

FIG. 4 includes a schematic overview of an architecture of the sub-modules of the perception module 204 of the vehicle control application 106 according to an exemplary embodiment of the present disclosure. As shown in FIG. 4, the perception module 204 may include sub-modules 402, 404, 406 that may be individually utilized to analyze the image data provided by the camera system 116 and the LiDAR data provided by the laser projection system 118 and may fuse such data to output fused data that includes goal data 214 associated with the person 104 to be followed and obstacle data 216 associated with one or more detected obstacles. In one embodiment, a pedestrian detection sub-module 402 may be configured to utilize the neural network 122 (e.g., configured as a convolutional neural network) to detect the person 104 to be followed by the vehicle 102 as a goal of the vehicle 102.

In one configuration, the pedestrian detection sub-module 402 may utilize machine learning/deep learning capabilities of the neural network 122 to detect one or more pedestrians that may be in a field of view of one or more cameras of the camera system 116 as included within the image data. In one embodiment, the pedestrian detection sub-module 402 may analyze the image data as a region-proposal based object detector (e.g., which may have a similar structure to Faster-RCNN). As discussed above, the neural network 122 may be pre-trained with a propriety dataset. The pedestrian detection sub-module 402 may be configured to select an image frame (e.g., middle frame, last frame) from a plurality of image frames extracted from the image data. The plurality of image frames may be associated with images/video that are captured by one or more of the cameras for a predetermined period of time (e.g., three second clips).

Upon analysis of the image data through the neural network 122 based on the pre-trained dataset, the pedestrian detection sub-module 402 may be configured to output computed bounding boxes over the selected image frame from a plurality of image frames extracted from the image data. In particular, the bounding boxes may be computed to encapsulate pixels of the selected image frame that include one or more pedestrians that may be located within the surrounding environment of the vehicle 102, as captured within the selected image frame. In addition to computing the bounding box locations of detected pedestrians, the pedestrian detection sub-module 402 may be configured to output a rough estimated distance between the vehicle 102 and each of the one or more detected pedestrians captured within the selected image frame.

In an exemplary embodiment, the pedestrian detection sub-module 402 may be configured to output pedestrian data that includes data pertaining to the one or more computed bounding box locations and the rough estimated distance between the vehicle 102 and each of the one or more detected pedestrians captured within the selected image frame. The pedestrian detection sub-module 402 may further analyze the one or more computed bounding box locations using image logic to determine the person 104 to be followed by the vehicle 102 as the goal of the vehicle 102. In one embodiment, the pedestrian detection sub-module 402 may be configured to output goal data 214 associated with the location of the person 104 that is to be followed by the vehicle 102.

Referring again to FIG. 3, upon inputting the image data to the perception module 204, the method 300 may proceed to block 306, wherein the method 300 may include receiving LiDAR data from the laser projection system 118. In an exemplary embodiment, the data reception module 202 of the vehicle control application 106 may be configured to communicate with the laser projection system 118 to receive LiDAR data that may be associated with the one or more reflected laser waves. In other words, the LiDAR data may include LiDAR based observations associated with the surrounding environment of the vehicle 102.

The method 300 may proceed to block 308, wherein the method 300 may include inputting the LiDAR data to the perception module 204 to detect one or more obstacles that are located within a predetermined distance of the vehicle 102. In an exemplary embodiment, upon receiving the LiDAR data, the data reception module 202 may be configured to input the LiDAR data associated with the images of the surrounding environment of the vehicle 102 to the perception module 204 of the vehicle control application 106. The perception module 204 may be configured to execute the perception algorithm that may be configured to analyze the LiDAR data to determine one or more obstacles that may be located within a predetermined distance of the vehicle 102 within the surrounding environment of the vehicle 102.

Referring again to FIG. 4, in one embodiment, upon receiving the LiDAR data, the LiDAR data may be analyzed by a dynamic occupancy sub-module 404 (DOM sub-module) of the perception module 204. The DOM sub-module 404 may be configured to analyze the LiDAR data by filtering the LiDAR data to include one or more reflected laser waves that are reflected a maximum predetermined distance. For example, in one configuration, the DOM sub-module 404 may be configured to analyze the LiDAR data by filtering LiDAR data to include one or more reflected laser waves that are reflected a maximum distance of 25 m. The DOM sub-module 404 may thereby define obstacles based on the one or more reflected laser waves that are measured at a height over a predetermined height above the ground. For example, in one configuration, one or more obstacles may be defined as any object with a height over 0.7 m above the ground. In one embodiment, the output of the DOM sub-module 404 may include a list of convex hulls and each convex hull may describe an obstacle's spatial dimensions. In one embodiment, the DOM sub-module 404 may be configured to output obstacle data 216 associated with the location and spatial dimensions of one or more obstacles that are determined to be located within a predetermined distance of the vehicle 102.

Figure 5:
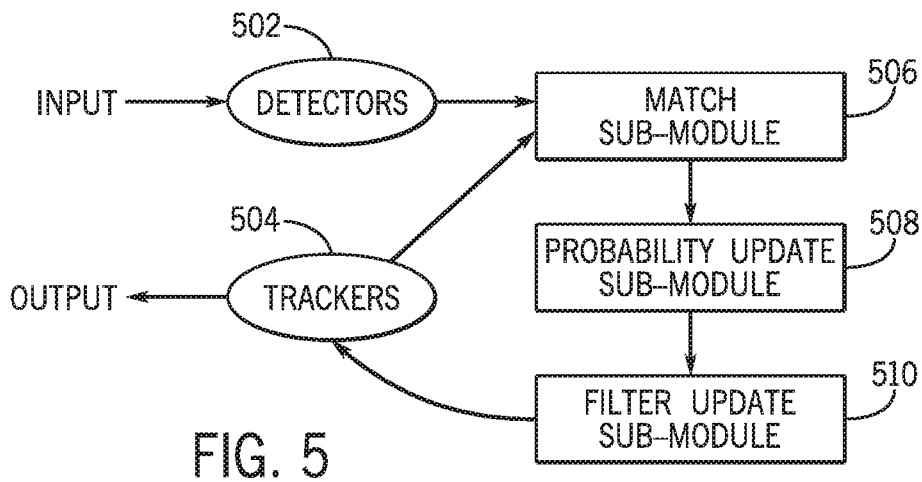
FIG. 5 is a schematic overview of the probabilistic sensor fusion sub-module's architecture according to an exemplary embodiment of the present disclosure.

With continued reference to FIGS. 3 and 4, the method 300 may proceed to block 310, wherein the method 300 may include fusing pedestrian and obstacle detection results. In one configuration, the outputs of the pedestrian detection sub-module 402 based on the image based inputs and the DOM sub-module 404 based on the LiDAR based inputs may be inputted to a probabilistic sensor fusion sub-module 406 of the perception module 204. FIG. 5 is a schematic overview of the probabilistic sensor fusion sub-module's architecture according to an exemplary embodiment of the present disclosure. In one embodiment, upon receiving the inputs pertaining to image based detections and the LiDAR based detections, the probabilistic sensor fusion sub-module 406 may be configured to fuse the pedestrian related data and obstacle related data into fused detections (detections) 502.

In particular, upon receiving the inputs pertaining to pedestrian related data and obstacle related data, the probabilistic sensor fusion sub-module 406 may be configured to perform matching between incoming detections 502 and existing trackers 504 using a match sub-module 506. The match sub-module 506 may be configured to execute a Hungarian algorithm, which is known in the art as a combinational optimization algorithm, to perform the matching between the incoming detections 502 and the existing trackers 504.

In particular, in one configuration, the probabilistic sensor fusion sub-module 406 may define a cost function between the detections 502 and trackers 504 with respect to the LiDAR based detections as a Euclidean distance between detection and tracker centers as the cost. The probabilistic sensor fusion sub-module 406 may define a cost function between the detections 502 and trackers 504 with respect to the image based detections as a pixel distance between the projection of the tracker 504 onto an image plane and bounding box center as the cost. The matching may yield three types of outcomes. For a matched detection and tracker, the detection may be used to update the tracker. Unmatched trackers may be updated with negative (e.g., empty) detection. Additionally, the probabilistic sensor fusion sub-module 406 may allow unmatched detections to generate new trackers.

To fuse the two types of detections, the probabilistic sensor fusion sub-module 406 may model the existence probability $P_{exist}$ of each tracked object. A probability update sub-module 508 of the probabilistic sensor fusion sub-module 406 may be configured to apply Bayes' Rule, to execute the equation of the Bayes' rule known in the art, to calculate an existence probability from an inverse sensor mode, P (existence I measurement). The probability update sub-module 508 may adopt a simple inverse sensor model by using certain false positive and false negative rates for the pedestrian data that includes data pertaining to the one or more computed bounding box locations and the rough estimated distance between the vehicle 102 and each of the one or more detected pedestrians captured within the selected image frame output by the pedestrian sub-module 402. Additionally, the probability update sub-module 508 may adopt a simple inverse sensor model by using certain false positive and false negative rates with respect to the output of the DOM sub-module 404 that may include a list of convex hulls as each convex hull may describe an obstacle's spatial dimensions.

Figure 6:
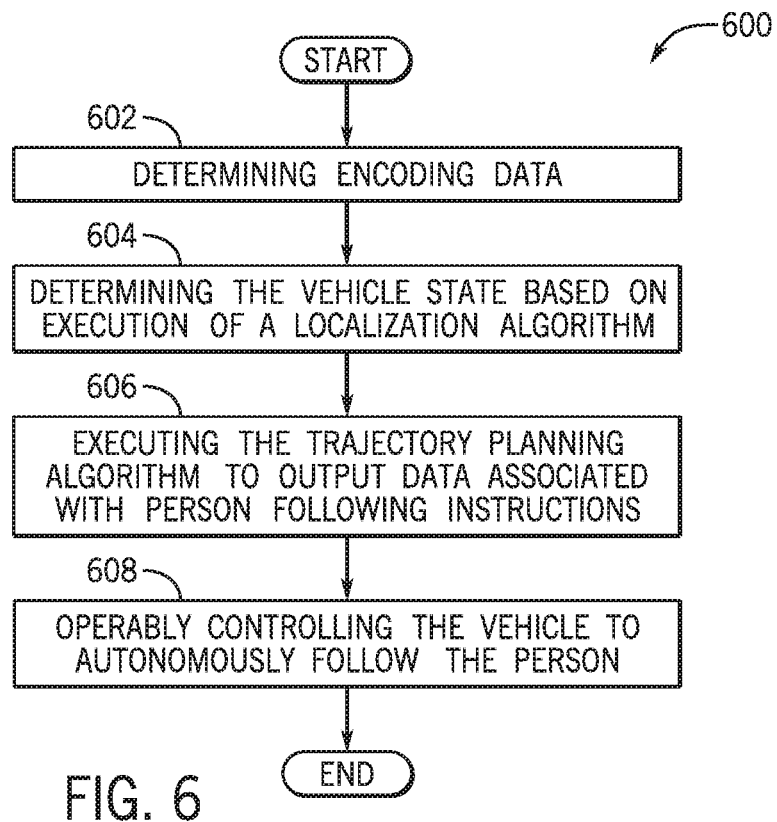
FIG. 6 is a process flow diagram of a method of executing a trajectory planning algorithm to output person following instructions to operably control the vehicle to autonomously follow a person according to an exemplary embodiment of the present disclosure.

The $P_{exist}$ may be used to create new trackers and delete obsolete trackers. A tracker may be created whenever its $P_{exist}$ exceeds a particular high threshold. This tracker is then deleted when its $P_{exist}$ drops below a particular low threshold. In one embodiment, a filter update sub-module 510 of the probabilistic sensor fusion sub-module 406 may be configured to estimate the position and velocity of every pedestrian (included within the selected image frame that is within the predetermined distance of the vehicle 102) using a Kalman filter, known in the art, with a constant velocity model. The probabilistic sensor fusion sub-module 406 may thereby output fused data that includes goal data 214 associated with the person 104 to be followed and obstacle data 216 associated with one or more detected obstacles FIG. 6 is a process flow diagram of a method 600 of executing the trajectory planning algorithm to output person following instructions to operably control the vehicle 102 to autonomously follow the person 104 according to an exemplary embodiment of the present disclosure. FIG. 6 will be described with reference to the components of FIG. 1 and FIG. 2 through it is to be appreciated that the method 600 of FIG. 6 may be used with additional and/or alternative system components. The method 600 may begin at block 602, wherein the method 600 may include determining encoding data with respect to the vehicle state. In one embodiment, the encoder module 206 of the vehicle control application 106 may be configured to determine encoder data based on vehicle dynamic data that may be communicated by the ECU 110 of the vehicle 102. The vehicle dynamic data may be determined from vehicle dynamic sensors (not shown) of the vehicle 102 based on the communication such data to the ECU 110. The vehicle dynamic data may include, but may not be limited to, steering data and speed data associated with one or more steering angles and speed of the vehicle 102. Accordingly, the encoder module 206 may determine speed encoders and steering encoders.

The method 600 may proceed to block 604, wherein the method 600 may include determining a vehicle state 218 based on execution of a localization algorithm. In an exemplary embodiment, upon determining the speed encoders and the steering encoders, the encoder module 206 may be configured to communicate respective data to the localization module 208 of the vehicle control application 106 to output a vehicle state 218 of the vehicle 102. The localization module 208 may execute localization algorithms, known in the art, which may extract and use data from the speed encoders and the steering encoders to estimate the vehicle state 218 of the vehicle 102 using an odometry-based estimate.

The method 600 may proceed to block 606, wherein the method 600 may include executing the trajectory planning algorithm to output data associated with person following instructions. In an exemplary embodiment, the perception module 204 may input the fused data that includes the goal data 214 associated with the detection of the person 104 to be followed by the vehicle 102 and obstacle data 216 associated with the detection of one or more obstacles located within a predetermined distance of the vehicle 102 to the trajectory planning module 210 of the vehicle control application 106. In an exemplary embodiment, the trajectory planning module 210 may be configured to execute the trajectory planning algorithm to overcome an optimization problem (e.g., optimal control problem) that may be formulated to incorporate the planner specifications of person following behavior, static and moving obstacle avoidance, suitability for front-wheel steering, optimization of speed and steering, and the utilization of minimum control effort. The optimization problem may be formulated as:

$$\underset{\xi(t),\zeta(t),\xi_{0_s},\xi_{f_s},t_f}{\text{minimize}} \quad J = M(\xi(t_0), t_0, \xi(t_f), t_f) +$$

$$\int_{t_0}^{t_f} L(\xi(t), \zeta(t), t)dt +$$

$$w_{s0}\xi_{0_s} + w_{sf}\xi_{f_s}$$

subject to
$$\frac{d\xi}{dt}(t) - f(\xi(t), \zeta(t), t) = 0$$

$$C(\xi(t), \zeta(t), t) \leq 0$$

$$\xi_0 - \xi_{0tol} \leq \xi(t_0) \leq \xi_0 + \xi_{0tol}$$

$$\xi_f - \xi_{ftol} \leq \xi(t_f) \leq \xi_f + \xi_{ftol}$$

$$\xi_{min} \leq \xi(t) \leq \xi_{max}$$

$$\zeta_{min} \leq \zeta(t) \leq \zeta_{max}$$

$$t_{fmin} \leq t_f \leq t_{fmax}$$

where $t_0$ is the constant initial time, $t_f$ is the variable final time, $\xi(t) \in \mathbb{R}^{n_{st}}$ is the state, and $n^{st}$ is the number of states $\zeta(t) \in \mathbb{R}^{n_{ctr}}$ is the control, $n^{st}$ is the number of controls, $\xi_0$ is the desired initial state vector, $\xi_{0tol}$ is the initial state tolerance vector, $\xi_f$ is the desired final state vector, $\xi_{ftol}$ is the final state tolerance vector, $\xi_{0_s}$ and $\xi_{f_s}$ are arrays of slack variables on the initial and terminal states, respectively, and $w_{s0}$ $w_{s0}$ and $w_{sf}$ are arrays of weights.

In an exemplary embodiment, the cost functional of the equation $+w_{s0}\xi_{0_s}+w_{sf}\xi_{f_s}$ is given as:

$$J = w_t t_f +$$

$$w_g \frac{(x(t_f) - x_g)^2 + (y(t_f) - y_g)^2}{(x(t_0) - x_g)^2 + (y(t_0) - y_g)^2 + \epsilon} +$$

$$w_{haf} \int_{t_0}^{t_f} [\sin(\psi_g)(x - x_g) - \cos(\psi_g)(y - y_g)]^2 dt +$$

$$w_{ce} \int_{t_0}^{t_f} \left[ w_{sf}\delta_f(t)^2 + w_{sr} sr(t)^2 + w_{a_x} a_x(t)^2 \right] dt +$$

$$w_{u_x} \int_{t_0}^{t_f} \frac{1}{u_x(t)^2 + \epsilon} dt +$$

$$w_{s0}\xi_{0_s} + w_{sf}\xi_{f_s}$$

where $\omega_t$, $\omega_g$, $\omega_{haf}$, $\omega_{ce}$, $\omega_{sf}$, $\omega_r$, $\omega_{a_x}$, $\omega_{u_x}$, $w_{s0}$, and $w_{sf}$ are constant weight terms, x(t) and y(t) are the vehicle's position coordinates, $x_g$ and $y_g$ are the coordinates of the person 104 as the goal of the vehicle 102, $\epsilon$ is a small number set to 0.01 for example, to avoid singularities, $\psi_9$ is the desired final heading angle, $\delta_f(t)$ and Sr(t) are respectively the steering angle and the steering rate, $u_x(t)$ is the longitudinal speed, and $a_x(t)$ is the longitudinal acceleration.

In one embodiment, by adding a minimum final time term, the trajectory planning algorithm may calculate more aggressive trajectories, which may enable the vehicle 102 to move towards the goal using a shortest possible path. In an exemplary embodiment, the trajectory planning module 210 may model the vehicle 102 using a nonlinear kinematic ground vehicle model to thereby model dynamic constraints of the vehicle 102. The dynamic constrains of the above stated equation $$\frac{d\xi}{dt}(t) - f(\xi(t), \zeta(t), t) = 0$$

may be defined using a kinematic vehicle as:

$$\dot{x}(t) = u_x(t)\cos\left(\psi(t) + \tan\left(\frac{l_a \tan(\delta_f(t))}{l_a + l_b}\right)^{-1}\right)$$

$$\dot{y}(t) = u_x(t)\sin\left(\psi(t) + \tan\left(\frac{l_a \tan(\delta_f(t))}{l_a + l_b}\right)^{-1}\right)$$

$$\dot{\psi}(t) = \frac{u_x(t)\sin\left(\tan\left(\frac{l_a \tan(\delta_f(t))}{l_a + l_b}\right)^{-1}\right)}{l_b}$$

$$\dot{u}_x(t) = a_x(t)$$

Where $\psi(t)$ is the yaw angle, $l_a$ may equal n wheel base distance meters (e.g., 0.6 m) and $l_b$ may equal n wheel base distance meters (e.g., 0.6 m) as wheel base distances of the vehicle 102.

In one embodiment, the trajectory planning module 210 may define path constraints to avoid overlap between the path of the vehicle 102 and static obstacles and/or dynamic obstacles located within the surrounding environment of the vehicle 102. Accordingly, the trajectory planning module 210 may execute time-varying hard constraints on the vehicle's trajectory to ensure that the vehicle's planed trajectory does not intersect with one or more obstacles' (that are located within the surrounding environment) predicted trajectories. The path constraints of the above mentioned equation: $C(\xi(t), \zeta(t), t) \leq 0$ are as follows:

$$\left(\frac{x(t) - (x0_{obs}[i] + v_x t)}{a_{obs}[i] + sm(t)}\right)^2 + \left(\frac{y(t) - (y0_{obs}[i] + v_y t)}{b_{obs}[i] + sm(t)}\right)^2 > 1, \text{ for } i \in 1{:}Q$$

where $$sm(t) = 0.45 + \frac{0.7 - 0.45}{t_f} t$$

describes the time-varying safety margin, $xo_{obs}[i]$ and $yo_{obs}[i]$ describe the positon of the center of the ith obstacle at time t, $a_{obs}$ and $b_{obs}$ are arrays of semi-major and semi-minor obstacles' axis, and Q is the number of obstacles.

Referring again to the method 600 of FIG. 6, upon executing the trajectory planning algorithm, the method 600 may proceed to block 608, wherein the method 600 may include operably controlling the vehicle 102 to autonomously follow the person 104. Based on the execution of the trajectory planning algorithm, the trajectory planning module 210 may output steering angle $\delta_f(t)$ and steering rate sr(t), the velocity $u_x(t)$ (longitudinal speed) to the vehicle control module 212 of the vehicle control application 106. In some configurations, the trajectory planning module 210 may also output x(t) and y(t) as the vehicle's position coordinates, $x_g$ and $y_g$ as the coordinates of the person 104 as the goal of the vehicle 102, $\psi_g$ as the desired final heading angle, and $a_x(t)$ as the longitudinal acceleration. Additionally, based on the execution of the localization algorithm (at block 604), the localization module 208 may output the vehicle state 218 $\varepsilon_0$ of the vehicle 102 to the vehicle control module 212.

In an exemplary embodiment, the vehicle control module 212 may evaluate numerous data points communicated to the vehicle control module 212 by the trajectory planning module 210 and the localization module 208. The vehicle control module 212 may be configured to communicate with the ECU 110 of the vehicle 102 to operably control the motor/engine control unit, the braking control unit, the turning control unit, the transmission control unit, and the like to control the vehicle 102 to be autonomously operated to follow the person 104 while ensuring static and moving obstacle avoidance, suitability for front-wheel steering, optimization of the speed and steering of the vehicle 102, while using minimum control effort in navigating the vehicle 102.

Figure 7:
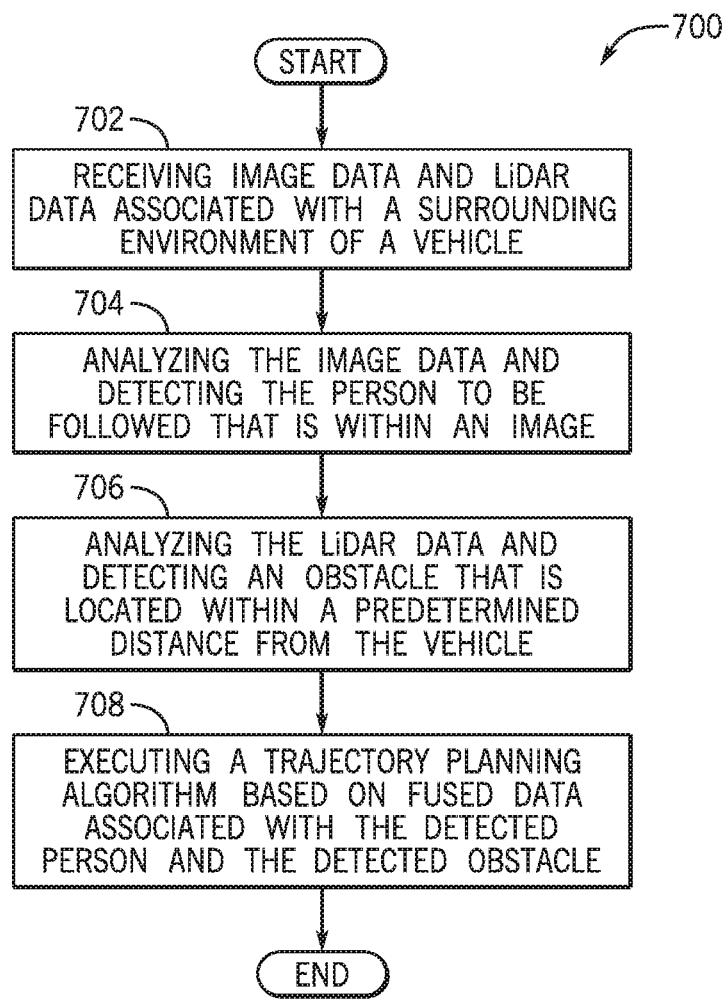
FIG. 7 is a process flow diagram of a method for providing a comprehensive trajectory planner for a person-following vehicle according to an exemplary embodiment of the present disclosure.

FIG. 7 is a process flow diagram of a method 700 method for providing a comprehensive trajectory planner for a person-following vehicle according to an exemplary embodiment of the present disclosure. FIG. 7 will be described with reference to the components of FIG. 1 and FIG. 2, through it is to be appreciated that the method 700 of FIG. 7 may be used with additional and/or alternative system components. The method 700 may begin at block 702, wherein the method 700 may include receiving image data and LiDAR data associated with a surrounding environment of a vehicle 102.

The method 700 may proceed to block 704, wherein the method 700 may include analyzing the image data and detecting the person to be followed that is within an image. The method 700 may proceed to block 706, wherein the method 700 may include analyzing LiDAR data and detecting an obstacle that is located within a predetermined distance from the vehicle 102. The method 700 may proceed to block 708, wherein the method 700 may include executing a trajectory planning algorithm based on fused data associated with the detected person and the detected obstacle. In one embodiment, the trajectory planning algorithm utilizes nonlinear model predictive control to enable the vehicle 102 to follow the person within the surrounding environment of the vehicle 102.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing a comprehensive trajectory planner for a person-following vehicle comprising:

receiving image data and LiDAR data associated with a surrounding environment of a vehicle;

analyzing the image data and detecting a person to be followed that is within an image, wherein an image frame is selected from a plurality of image frames extracted from the image data and pixels of the image frame that include at least one pedestrian that is located within the surrounding environment of the vehicle are encapsulated into at least one bounding box to be analyzed to detect the person to be followed;

analyzing the LiDAR data and detecting an obstacle that is located within a predetermined distance from the vehicle; and executing a trajectory planning algorithm based on fused data associated with the detected person and the detected obstacle, including fusing pedestrian and obstacle detection results, wherein fusing the pedestrian and the obstacle detection results includes performing matching between the pedestrian and obstacle detection results and existing tracker data, wherein tracker data is updated for a matched detection and tracker that is above a first threshold and the fused data is output, and for a matched detection and tracker that is below a second threshold and the tracker is deleted as obsolete, wherein the trajectory planning algorithm utilizes nonlinear model predictive control based on the fused data that is output to enable the vehicle to follow the person within the surrounding environment of the vehicle.

2. The computer-implemented method of claim 1, wherein analyzing the image data includes inputting the image data to a perception algorithm to detect at least one pedestrian that is located within the surrounding environment of the vehicle, wherein at least one computed bounding box location and a rough estimated distance between the vehicle and the at least one pedestrian is determined to detect the person to be followed.

3. The computer-implemented method of claim 2, wherein analyzing the LiDAR data includes inputting the LiDAR data to the perception algorithm, wherein the LiDAR data is filtered to include at least one laser wave that is measured at a height over a predetermined height to determine the obstacle that is located within the predetermined distance of the vehicle, wherein at least one convex hull is output that pertains to spatial dimensions of the obstacle.

4. The computer-implemented method of claim 3, further including determining encoding data based on vehicle dynamic data of the vehicle, wherein speed encoders and steering encoders are output to a localization algorithm.

5. The computer-implemented method of claim 4, wherein the localization algorithm is executed to extract and use data from the speed encoders and the steering encoders to estimate a vehicle state of the vehicle using an odometry-based estimate.

6. The computer-implemented method of claim 5, wherein executing the trajectory planning algorithm based on the fused data includes inputting the vehicle state and the fused data to the trajectory planning algorithm, wherein the fused data includes goal data associated with the detection of the person to be followed by the vehicle and obstacle data associated with the detection of the obstacle that is located within the predetermined distance of the vehicle.

7. The computer-implemented method of claim 6, wherein the trajectory planning algorithm models the vehicle using a nonlinear kinematic ground linear model to model dynamic constraints of the vehicle and defines path constraints to avoid overlap between a path of the vehicle and the obstacle.

8. The computer-implemented method of claim 1, wherein the trajectory planning algorithm outputs steering angle, steering rate, velocity value, position coordinates of the vehicle, position coordinates of the person to be followed as a goal of the vehicle, a longitudinal acceleration value, and a desired final heading to autonomously control the vehicle to follow the person while ensuring path overlap avoidance with respect to the obstacle, optimizing speed and steering, and minimizing control effort.

9. A system for providing a comprehensive trajectory planner for a person-following vehicle comprising:
 a memory storing instructions when executed by a processor cause the processor to:
 receive image data and LiDAR data associated with a surrounding environment of a vehicle;
 analyze the image data and detecting a person to be followed that is within an image, wherein an image frame is selected from a plurality of image frames extracted from the image data and pixels of the image frame that include at least one pedestrian that is located within the surrounding environment of the vehicle are encapsulated into at least one bounding box to be analyzed to detect the person to be followed;
 analyze the LiDAR data and detecting an obstacle that is located within a predetermined distance from the vehicle; and
 execute a trajectory planning algorithm based on fused data associated with the detected person and the detected obstacle, including fusing pedestrian and obstacle detection results, wherein fusing the pedestrian and the obstacle detection results includes performing matching between the pedestrian and obstacle detection results and existing tracker data, wherein tracker data is updated for a matched detection and tracker that is above a first threshold and the fused data is output, and for a matched detection and tracker that is below a second threshold and the tracker is deleted as obsolete,
 wherein the trajectory planning algorithm utilizes nonlinear model predictive control based on the fused data that is output to enable the vehicle to follow the person within the surrounding environment of the vehicle.

10. The system of claim 9, wherein analyzing the image data includes inputting the image data to a perception algorithm to detect at least one pedestrian that is located within the surrounding environment of the vehicle, wherein at least one computed bounding box location and a rough estimated distance between the vehicle and the at least one pedestrian is determined to detect the person to be followed.

11. The system of claim 10, wherein analyzing the LiDAR data includes inputting the LiDAR data to the perception algorithm, wherein the LiDAR data is filtered to include at least one laser wave that is measured at a height over a predetermined height to determine the obstacle that is located within the predetermined distance of the vehicle, wherein at least one convex hull is output that pertains to spatial dimensions of the obstacle.

12. The system of claim 11, further including determining encoding data based on vehicle dynamic data of the vehicle, wherein speed encoders and steering encoders are output to a localization algorithm.

13. The system of claim 12, wherein the localization algorithm is executed to extract and use data from the speed encoders and the steering encoders to estimate a vehicle state of the vehicle using an odometry-based estimate.

14. The system of claim 13, wherein executing the trajectory planning algorithm based on the fused data includes inputting the vehicle state and the fused data to the trajectory planning algorithm, wherein the fused data includes goal data associated with the detection of the person to be followed by the vehicle and obstacle data associated with the detection of the obstacle that is located within the predetermined distance of the vehicle.

15. The system of claim 14, wherein the trajectory planning algorithm models the vehicle using a nonlinear kinematic ground linear model to model dynamic constraints of the vehicle and defines path constraints to avoid overlap between a path of the vehicle and the obstacle.

16. The system of claim 9, wherein the trajectory planning algorithm outputs steering angle, steering rate, velocity value, position coordinates of the vehicle, position coordinates of the person to be followed as a goal of the vehicle, a longitudinal acceleration value, and a desired final heading to autonomously control the vehicle to follow the person while ensuring path overlap avoidance with respect to the obstacle, optimizing speed and steering, and minimizing control effort.

17. A non-transitory computer readable storage medium storing instructions that when executed by a computer, which includes a processor perform a method, the method comprising:
 receiving image data and LiDAR data associated with a surrounding environment of a vehicle;
 analyzing the image data and detecting a person to be followed that is within an image, wherein an image frame is selected from a plurality of image frames extracted from the image data and pixels of the image frame that include at least one pedestrian that is located within the surrounding environment of the vehicle are encapsulated into at least one bounding box to be analyzed to detect the person to be followed;
 analyzing the LiDAR data and detecting an obstacle that is located within a predetermined distance from the vehicle; and
 executing a trajectory planning algorithm based on fused data associated with the detected person and the detected obstacle, wherein fusing the pedestrian and the obstacle detection results includes performing matching between the pedestrian and obstacle detection results and existing tracker data, wherein tracker data is updated for a matched detection and tracker that is above a first threshold and the fused data is output, and for a matched detection and tracker that is below a second threshold and the tracker is deleted as obsolete,
 wherein the trajectory planning algorithm utilizes nonlinear model predictive control based on the fused data to enable the vehicle to follow the person within the surrounding environment of the vehicle.

18. The non-transitory computer readable storage medium of claim 17, wherein the trajectory planning algorithm outputs steering angle, steering rate, velocity value, position coordinates of the vehicle, position coordinates of the person to be followed as a goal of the vehicle, a longitudinal acceleration value, and a desired final heading to autonomously control the vehicle to follow the person while ensuring path overlap avoidance with respect to the obstacle, optimizing speed and steering, and minimizing control effort.

* * * * *